Nov. 25, 1941. F. W. SAMPLE 2,263,740
WELDING METHOD AND APPARATUS
Filed Aug. 11, 1937 3 Sheets-Sheet 1
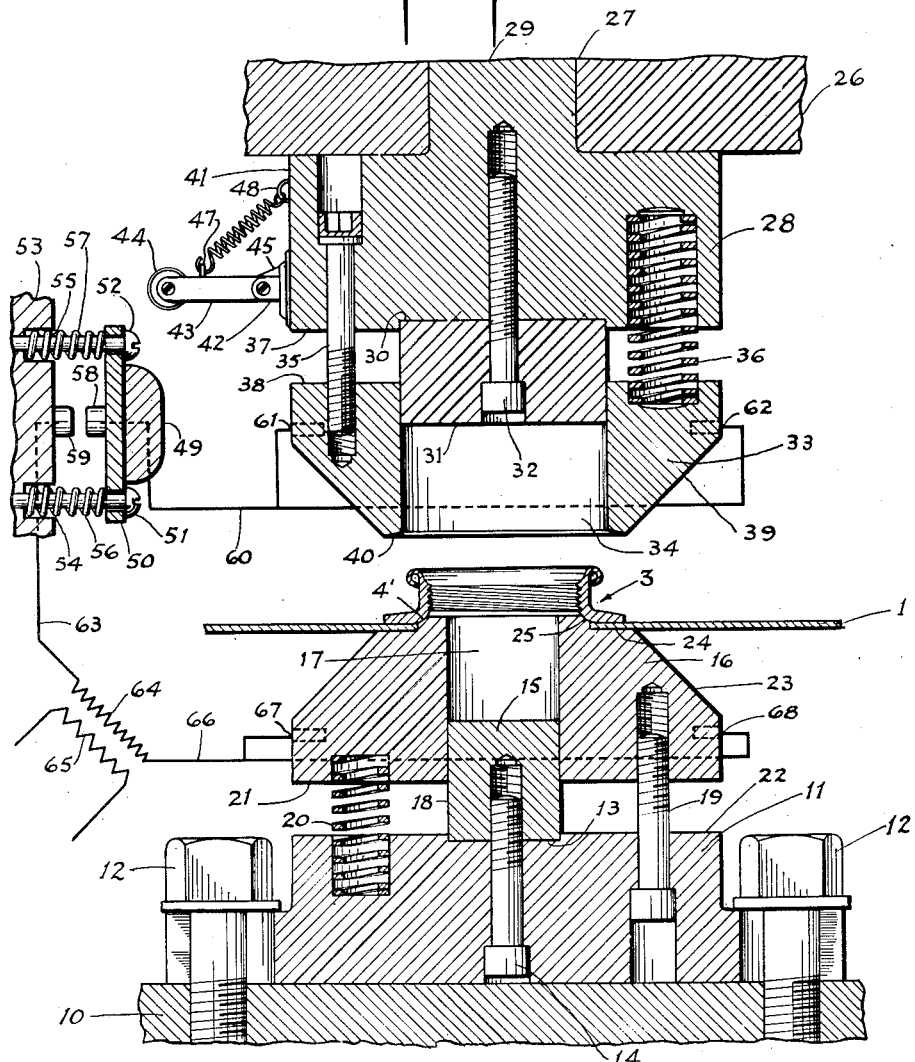
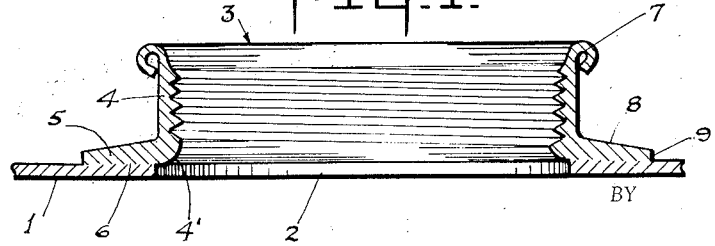
INVENTOR.
FLECK. W. SAMPLE.
BY
Albert M. Parker
ATTORNEY.

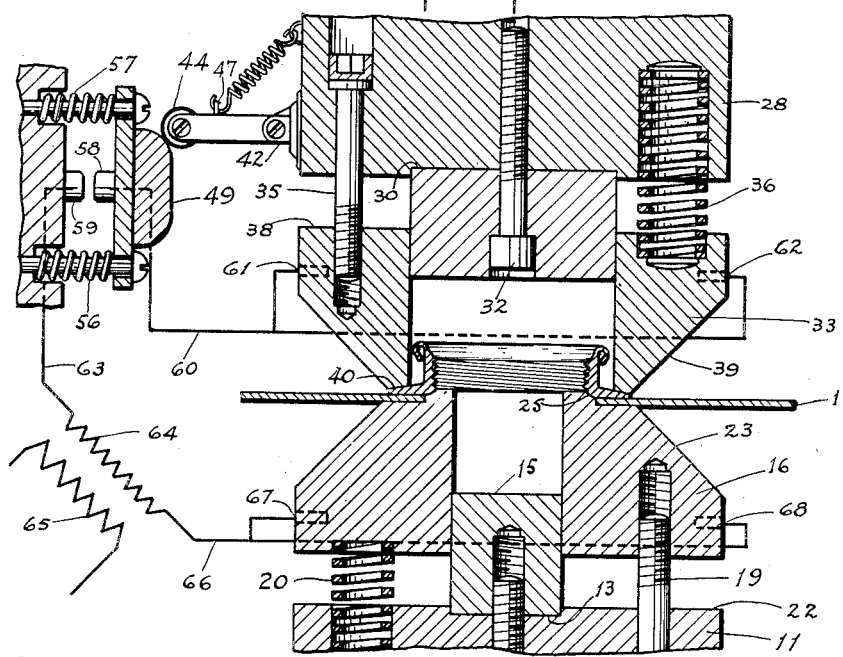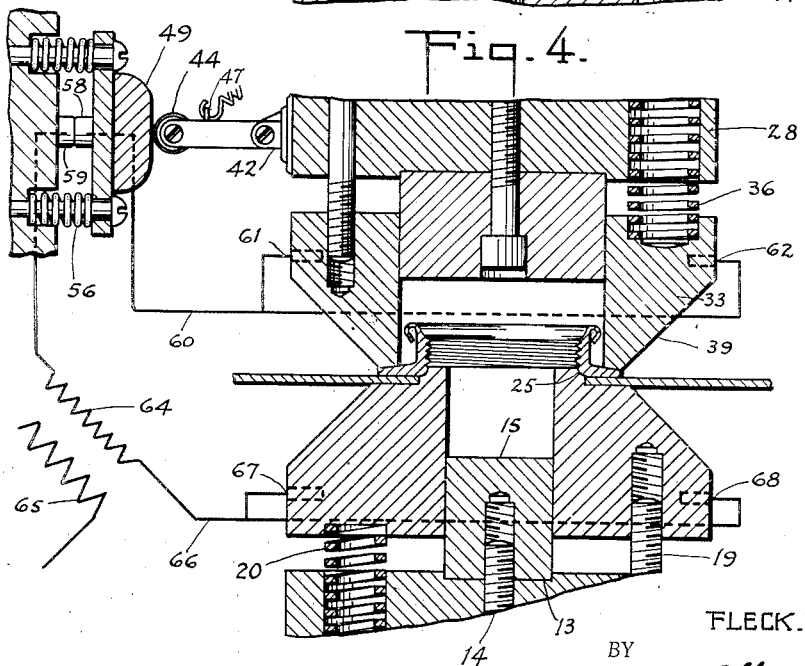

Nov. 25, 1941. F. W. SAMPLE 2,263,740
WELDING METHOD AND APPARATUS
Filed Aug. 11, 1937 3 Sheets-Sheet 3
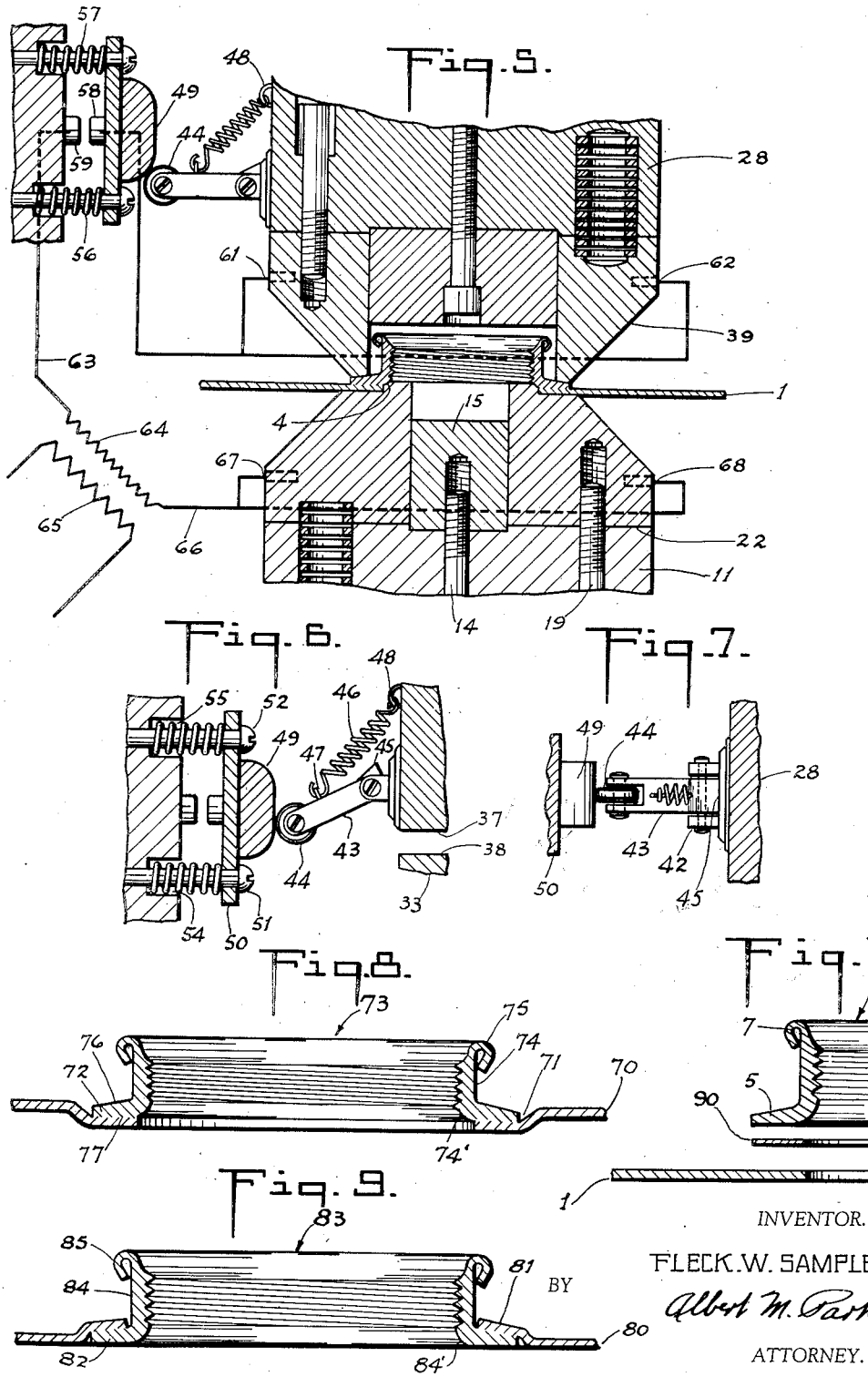
INVENTOR.
FLECK.W. SAMPLE
BY Albert M. Parker
ATTORNEY.

Patented Nov. 25, 1941

2,263,740

UNITED STATES PATENT OFFICE 2,263,740

WELDING METHOD AND APPARATUS

Fleck William Sample, New York, N. Y., assignor to American Flange & Manufacturing Co., Inc., New York, N. Y., a corporation of Illinois Application August 11, 1937, Serial No. 158,477

12 Claims. (Cl. 219—4)

This invention relates to the method of and means for forming welded closure part combinations and has to do particularly with the welding of flanges or bushings to metal container walls, the manner in which said combination is formed and the means employed for forming the same.

A principal object of this invention is the provision of a method for forming closure element combinations for metal containers and the like, which will be simple, inexpensive and leak-proof.

Another object is the provision of a method for forming a closure combination of the above character which can be rapidly turned out in a uniform manner without the necessity of employing skilled labor.

Another object is the provision of a method for forming welded closure combinations of the above character which are neat in appearance and which have provision for sealing caps to be employed in precluding any possibility of leakage between the closure element and the plug received therein.

Another object is the provision of a method for forming a closure combination which will be at least as strong as the container wall to which it is applied and which will not deteriorate with use.

Still another object of the invention resides in the method of forming closure combinations of the above character, wherein the welding takes place in a single operation in a minimum of time.

Still another object is the provision of a method of welding closure parts to container walls, wherein the heat of welding is localized and the product produced is characterized by its uniformity.

Further objects of the invention reside in the provision of simple apparatus for carrying out the above method, which apparatus is fool-proof, can be operated by non-skilled workmen and can be formed by the conversion of existing apparatus.

Further objects of the invention will in part be obvious and will in part appear hereinafter.

The invention accordingly comprises the several steps and the relation and order of one or more of such steps with respect to each of the others, the apparatus embodying features of construction, combinations and arrangement of parts, adapted to affect such steps, and the article which possesses the characteristics, properties, and relation of elements, all as exemplified in the detailed disclosure hereinafter set forth and the scope of the application of which will be indicated in the claims.

Heretofore when the flanges or bushings, provided at the openings in metal containers for receiving closure plugs and the like, have been welded in place, the same has not been a very satisfactory operation for various reasons. In the first place, the welding was almost universally done by hand by means of a torch or arc, which precluded the possibility of making the complete weld in one sudden operation and required that heat be applied slowly around the periphery of the flange or bushing. There was nothing in this system to assure that the heat applied would be even; and, in fact, the heat given off by the torch itself might fluctuate from time to time. Accordingly, warping of the stock of the container wall and also of the flange was not uncommon—with the result that not only was an unsightly job performed, but also the possibility of leakage between the container stock and flange was always present and often materialized. Furthermore, this securing process was slow, expensive, required skilled labor for its performance and required that the step of lithographing the container wall be postponed until after the welding had taken place inasmuch as part of the lithographing would be burned off during the welding operation.

As to the closure combination itself, the welded type heretofore employed were bulky, were intended to be welded by means of a flux between the lateral edge and the adjacent wall of the container, and, being formed in most instances of cast iron, would rust readily. These fittings had no provision for the application of a seal cap to assure against leakage between the screw plug and its seat. In fact, these fittings were designed to provide a broad, flat, outer surface against which a heavy fiber gasket was compressed when the bulky cast iron plug, under whose head such gasket was carried, was screwed into place. Many factors contributed to make this closure an unsatisfactory one. Due to the foregoing and to the presence of other undesirable features a demand for improvement in this field has been built up, which demand is satisfied by the present invention.

Not only does the closure element structure of this invention remove the undesirable effects of prior constructions in this field, but the invention also contemplates provision of a novel method for uniting the closure parts and also provides a device which eliminates the tedious, expensive and non-uniform operations of the prior art. The flange or bushing of this invention has its stock reduced to a minimum, is provided with means for receiving a seal cap, is light in weight and yet has all the requisite attributes for forming part of an entirely satisfactory closure.

The method of this invention contemplates securing the flange or bushing to a container wall by a continuous single welding operation which unitarily joins the bushing or flange and the container wall throughout a zone common to each. This is done quickly and without undue dissipation of heat—hence, any unevenness in the weld or burning of the container wall lithographing is precluded. Moreover, the apparatus employed in carrying out the method of this invention is simple in construction and operation and does not require the attendance of a highly skilled workman. Accordingly, the invention does more than merely eliminate one or another of the disadvantages of prior art constructions and methods, as it goes to the root of the problem and eliminates them all.

For a fuller understanding of the nature and objects of the invention, reference should be had to the following detailed description taken in connection with the accompanying drawings, in which:

Figure 1 is a vertical section on enlarged scale of a closure combination in accordance with this invention.

Figs. 2, 3, 4 and 5 are vertical sections through the apparatus of this invention illustrating the several positions in the operation of said apparatus and showing the effect of the same upon the parts of a closure combination received therein.

Fig. 6 is a vertical section of the switch shown in Figs. 2 to 5 illustrating the operation of the same during the return movement of the apparatus.

Fig. 7 is a plan view of the switch further illustrating the construction thereof.

Figs. 8 and 9 are views similar to Fig. 1 but on slightly reduced scale and showing alternative closure combination constructions.

Fig. 10 is an exploded view in vertical section illustrating an alternative manner of securing together the parts of a closure combination.

In Fig. 1 of the accompanying drawings there is shown at 1 a section of a metal container wall having an aperture 2 therein. Seated on said wall and defining the aperture 2 is a flange generally shown at 3 having a bushing portion 4 and a skirt, or collar, portion 5. Collar 5 is shown at 6 as unitarily joined to wall 1 by welding as will appear hereinafter. As shown, the joinder takes place throughout the entire width of the annular zone surrounding aperture 2 common to wall 1 and collar 5, but obviously the zone of joinder could be restricted in width and be other than annular while still providing a strong and liquid tight union as long as it completely surrounded aperture 2. The bushing portion 4 is normally threaded internally, as shown, and has an upper reduced neck, which is beaded over as shown at 7, for the reception of a seal cap of the type disclosed in U. S. Patent No. 1,982,145 to John W. Shera. At the bottom of the threads where the inside of bushing 4 merges with collar 5, a convexly curved annular surface 4' is formed to aid in locating the flange during the welding operation.

Collar 5 may be annular in outline in conformity with normally round aperture 2, or it may have an irregular outline such as octagonal or the like. It is to be particularly noted that the upper surface 8 of collar 5 slopes downwardly from the bushing portion 4 to the periphery 9. This slope facilitates the welding operation as will appear more fully hereinafter.

The apparatus of this invention, as shown in Figs. 2 to 5, is in some respects similar to the type of press and die construction used in performing metal pressing or stamping operations. It is modified, however, to render it effective for performing a welding operation. As the conventional parts of a press are not necessary to the understanding of the invention, the same have been eliminated.

At 10 in Fig. 2 is shown the bed plate on which is supported the shoe 11, which shoe is held firmly in place on bed plate 10 by bolts 12. Seated in a slight depression 13 in shoe 11 and held in place therein by bolt 14 is a lower guide block 15. Mounted for vertical sliding movement on the guide block 15 is lower electrode member 16, which has a central aperture 17 therein bored to slide on the side wall 18 of guide block 15 in a precise manner so as to prevent movement other than vertical of lower electrode member 16.

For further guiding the movement of lower electrode 16 there are provided bolts 19, which are slidably mounted in shoe 11 and are paired off on the opposite side of said shoe with compression springs 20. Though only one pair of these bolts and springs is shown, it is to be understood that several pairs, normally three, are employed to give an even resilient movement to member 16. Compression springs 20 have their ends seated in opposed sockets in shoe 11 and electrode 16, as is obvious from the drawings. Electrode 16 is formed of wear resistant material, which, nevertheless, is a good conductor of electricity. The under surface 21 of electrode 16 and the upper surface 22 of shoe 11 are accurately formed for non-tilting engagement and in that regard it is to be particularly noted that surfaces 21 and 22 will come together before bolt 19 reaches the end of its travel and before guide block 15 reaches the top of bore 17.

The upper surface of electrode 16 is not only reduced in section to expedite the passage of an electric current therethrough, but is provided with ledges to assure the accurate locating thereon of the portion of container wall 1 adjacent aperture 2 and flange 3, which is to be welded thereto to form the closure combination of this invention. The reduced section is due largely to a taper 23 given to the outside, annular surface of electrode 16. Annular rectangular surface 24, adjacent the top of electrode 16, is formed for receiving and locating the portion of container wall 1 adjacent aperture 2. Extending upwardly from the inner periphery of surface 24 is a concave curved surface 25, also annular, formed to accurately locate a flange 3 thereon due to its engagement with the lower internal curved surface 4' of flange 3. From the top of surface 25, electrode 16 extends inwardly to bore 17. Thus the electrode provides backing for the precision locating surfaces 24 and 25 while restricting to a minimum the area of the electrical path through collar 5 and the engaged portion of container wall 1. Obviously surfaces 24 and 25 can be formed with different contours if it is desired to locate thereon closure elements differently formed, such as those shown in Figs. 8 and 9; but it must be borne in mind that in this type of welding it is desirable to keep the area of the electrical path as small as possible in order to induce economy and efficiency of operation.

The upper portion of the machine of this invention is generally similar to the bottom portion, but is necessarily modified due to the fact that it imparts the pressing force. In Fig. 2, a plate holder, shown generally at 26, is apertured at 27 to carry a head plate 28 by receiving a mounting shank 29. Usually a bolster plate, or some similar means is employed to retain shank 29 in aperture 27—but the same being conventional and not necessary to the understanding of this invention it is omitted. A depression 30 formed centrally of the lower face of head plate 28 receives the upper end of an upper guide block 31, which is retained in place in said depression 30 by means of a securing bolt 32.

Mounted for vertical sliding movement on upper guide block 31 is upper electrode member 33, which, similar to lower electrode member 16, has its mounting designed to provide precise vertical movement. This is brought about by the accurate boring of aperture 34, which receives guide block 31 in sliding relation, and by opposed pairs of bolt and spring elements numbered 35 and 36 respectively. The travel of bolt 35 in its mounting is substantially the same as that of bolt 19, but spring 36 is of larger diameter than spring 20 due to the fact that electrode 33 transmits the pressure introduced by the reciprocation of member 26 and has less mass than electrode 16 so is more subject to rupture by shock. The same number of bolt and spring pairs would be used around electrode 33 as around lower electrode 16. Here again surfaces 37, forming the lower face of plate 28 and surface 38 forming the upper face of electrode 33, are accurately formed so as to seat against each other without any possibility of tilting or rocking.

The outer surface of electrode 33 tapers inwardly and downwardly, as shown at 39, ending at annular surface 40 which separates it from bore 34.

Surface 40 is formed to be co-mating with upper surface 8 of the flange collar 5, so in the example shown slopes inwardly and upwardly. This surface 40 is limited in width as much as possible without sacrificing too much of the strength of that part of upper electrode 33, inasmuch as the area of the electrical path through surface 40 must be kept as small as possible. Electrode 33, similar to electrode 16, is formed of material of high electrical conductivity but of good wearing quality. Bore 34, as shown best in Figs. 2 to 5, is made somewhat larger than the beaded-over portion 7 of flange 3 to allow electrode 33 to pass down over said beaded portion and to preclude the possibility of an electric charge jumping from electrode 33 to bead 7.

Pivoted to the side wall 41 of head plate 28 by means of a yoke 42 is an arm 43, as best shown in Fig. 7. Pivotally mounted in the outer end of arm 43 is a roller 44; while at the inner end of arm 43, extending laterally upward therefrom, as best shown in Fig. 6, is a stop shoulder 45. A coiled spring 46 extends from a ring 47 adjacent the outer end of arm 43 to another ring 48 on wall 41 at a position somewhat above the yoke 42. This spring is normally under sufficient tension to hold arm 43 up in the position shown in Fig. 2.

Supported at a point adjacent the path of travel of roller 44, due to the reciprocation of the plate by which the roller is carried, is a spring-pressed switch member having a cam face 49 mounted on a cross piece 50, which extends slightly above and below cam face 49 and is apertured for slidably receiving guide bolts 51 and 52. Said guide bolts extend into the wall of a bracket 53 centrally of sockets 54 and 55 formed in the same and are surrounded by compression springs 56 and 57 whose inner ends engage the bottom of sockets 54 and 55 and whose outer ends press against the inside of cross piece 50. Carried on the inside of cross piece 50 and on the outside of bracket 53 are aligned electrical contacts 58 and 59, which are normally spaced apart due to the action of springs 56 and 57. A lead wire 60 runs from contact 58 and forms two or more branches which are received at equidistant points 61 and 62 on the periphery of electrode member 33. From contact 59, another lead 63 passes down to the secondary 64 of a transformer having a primary 65. From the secondary 64, another lead 66, having branches in the same number as those of lead 60, extends to and is secured in electrode member 16 at equidistant points 67 and 68 around the periphery thereof. Any convenient source of power, not shown, may be employed for transformer 64—65.

In the alternative closure element combination shown in Fig. 8, container wall 70 is shown as provided with a downwardly extending embossing 71 in which is received the collar 72 of a flange 73. This flange, similar to that of Fig. 1, has an upwardly extending bushing portion 74, an upwardly curved inner corner 74' and has the upper end of its neck beaded over at 75. Collar 72 has a downwardly sloping upper surface 76 and the collar may be annular or irregular in outline, as stated with respect to Fig 1. As shown at 77 in Fig. 8, the lower face of collar 72 and the upper face of embossing 71 are merged to form a welded joint, which may extend throughout the engaged surfaces or through only a portion of the same as previously pointed out.

Another alternative is shown in Fig. 9 wherein container wall 80 has an upwardly extending embossing 81, which receives therebeneath a collar 82 of a flange 83. In this instance the upper surface of flange 82 is sloped downwardly before welding takes place but the same is barely noticeable in the illustration of Fig. 9, inasmuch as the embossed portion 81 of container wall 80 and the upper portion of collar 82 are shown as unitarily joined by welding. This flange, similar to those previously described, has an upwardly extending bushing portion 84, a curved locating surface 84' and a beaded-over neck 85. Here again the periphery of collar 82 and embossing 81 may be of any desired shape.

In Fig. 10 a modification of the manner of securing the flange of the invention to a container wall is shown in the provision of a flux or wafer indicated at 90. This wafer is shaped to correspond to the lower surface of collar 5 or to a restricted zone therearound and, being formed of material of high electrical resistance, aids in the welding of collar 5 to container wall 1 when the same are pressed together during the welding operation. Though this modification has been shown as applied to the closure combination of Fig. 1, obviously it is just as applicable to the forms of Figs. 8 and 9.

The method of forming a closure combination according to this invention will become apparent as the description of the operation of the apparatus illustrated proceeds. It is to be definitely understood, however, that the operation of the particular apparatus shown is merely illustrative and that the method is not limited in any way by that illustration. As shown in Fig. 2, when it is desired to weld a flange 3 to a container wall 1, the container wall is placed with its portion adjacent the opening 2 in engagement with locating surface 24, while flange 3 is properly located on top of the same with curved edge 4' engaging locating surface 25. At this stage the apparatus is in retracted position and roller 44 is well above cam surface 49 so that contacts 58 and 59 are spaced apart. The next step is to start a downward operation of electrode 33, which is caused by the downward movement of plate holder 26 imparted to electrode 33 through head plate 28 and springs 36.

In Fig. 3 electrode 33 is shown as having traveled down to where its surface 40 has just come into engagement with the upper surface 8 of flange 3. At this point the compression of springs 36 and 20 is about to begin, but, inasmuch as roller 44 has yet to climb onto the high, flat surface of cam face 49, the circuit remains open and no current will pass through the electrodes and the closure parts. On continued downward movement being imparted to electrode 33, springs 20 and 36 are compressed and accordingly the downward force transmitted through electrode 16 is increased. Thus by the time roller 44 arrives on the high, flat surface of cam face 49, thereby forcing cross piece 50 inwardly against the action of springs 56 and 57 to carry contact 58 into engagement with contact 59, sufficient pressure is being exerted on collar 8 and the engaged portion of container wall 1 to hold the same firmly together and eliminate arcing during the passage therethrough of an electric welding current. This pressure must be considerable as the electrical resistance of collar 5 and container wall 1 is high as contrasted to that of electrodes 16 and 33 and the design is such as to provide a proper weld without burning of the portions to be welded.

In Fig. 4 roller 44 is shown as having reached the mid-point of cam face 49 while a proportionately greater compression of springs 20 and 36 has taken place due to the downward travel of plate 28. At this point the pressure has greatly increased while the current has been flowing a sufficient time to raise collar 5 and the portion of container wall 1 in engagement therewith to a high temperature.

In the final step, as shown in Fig. 5, springs 20 and 35 have been completely compressed while surfaces 21 and 22 have come into contact as have surfaces 37 and 38. Accordingly the cushioning effect of the springs is no longer present and the full pressure of the press will suddenly be imparted to collar 5 and the engaged portion of container wall 1. Just before this jolt is rendered, however, roller 44 will have passed off the high, flat surface of the cam face 49 and will have fallen in sufficiently on the lower side of said face to allow springs 56 and 57 to part contacts 58 and 59. Accordingly the instant that collar 5 and container wall 1 have been heated to arrive at a plastic welding state, the current passing through the same is cut off and the step of suddenly pressing the portions to be welded into proper engagement follows immediately thereafter. As the container wall and flange collar may be made of materials of different electrical resistance, some means must be provided to have them both arrive at a plastic state together and preclude the possibility of one or the other burning. This is brought about by imparting a taper to collar 5 by means of downwardly sloping surface 8. In this way at least an annular zone of collar 5 will be sure to form a perfect weld with the container wall though the latter may be subject to slight variation in material and thickness.

The time consumed for this whole operation is very short and is controlled by various factors, such as the size and material of the parts to be welded and the current and pressure employed. This can be readily determined by one skilled in the art and it is not thought necessary to go into such details in this disclosure.

As shown in Fig. 6, the construction of arm 43 and its mounting is such that switch contacts 58 and 59 will not be closed by the return action of head plate 28. This is due to the fact that, though a stop shoulder 45 is provided on the top of arm 43 at its inner end to act against the base of yoke 42 to retain the arm in horizontal position during the downward movement of plate 28, no such shoulder is present on the lower side of arm 43. Accordingly, on the upward movement of plate 28, roller 44, being in engagement with cam face 49, will be forced downward, causing arm 43 to pivot in its yoke mounting 42 and swing downwardly, since springs 56 and 57 are stronger than spring 46 and accordingly overcome the same. When roller 44 has traveled up to where it clears cam face 49, spring 46 will again be free to return arm 43 to its initial horizontal position.

Although no specific means has been shown for performing the welding together of the closure combination elements of Figs. 8 and 9, it is obvious that this could be taken care of by slight modifications in the locating surfaces of lower die member 16.

Though the device of this invention has been shown as adapted to regular resistance welding, it is obvious that the same could be employed to perform percussion welding—that is, the transformer 64—65 could be replaced by a condenser adapted to be highly charged which could be arranged to be discharged at the instant of impact of die member 33 caused by surfaces 21 and 22 and 37 and 38 coming into engagement.

Since certain changes in the above article and in carrying out the above method and in the constructions set forth, which embody the invention, may be made without departing from its scope, it is intended that all matter contained in the above description or shown in the accompanying drawings shall be interpreted as illustrative and not in a limiting sense.

The invention accordingly comprises the features of construction, combinations of elements and arrangement of parts, and the several steps and the relation and order of one or more of such steps with respect to each of the others thereof, all of which will be exemplified hereinafter and the scope of the application of which will be indicated in the claims.

Having described my invention, what I claim as new and desire to secure by Letters Patent is:

1. The method of welding a closure element to a container wall adjacent an opening therein, which comprises, inserting part of said container wall including said opening between welding electrodes, mounting the stock of said wall immediately around the opening therein in fixed relation with respect to a fixed axis by introducing a locating member through said opening and moving said stock down over said locating member to engage the periphery of said opening and the stock therearound with a seat for the same, mounting the closure element with respect to said fixed axis by disposing the same over said extending locating member, seating the element on the free face of said stock adjacent said opening, and thereafter applying pressure to said element and the stock surrounding said opening through a restricted annular zone common to each and passing an electric current through said zone.

2. The method of securing a closure element to a container wall adjacent an opening therein, which comprises, inserting the portion of the container wall adjacent said opening between welding electrodes, mounting an annular portion of the stock of said wall around the opening therein in position with respect to a fixed axis by introducing a locating member through said opening and moving the annular portion of said stock down over said locating member to engage the periphery of said opening and said annular portion against an annular support, mounting the closure element with respect to said fixed axis by disposing the same over said extending locating member, seating the element on the free face of the annular portion of said stock with a part of the element overlying said annular portion, applying pressure to the overlying parts of said element and stock through a restricted portion of the annular zone common to each and passing an electric current through the restricted portion of said annular zone.

3. The method of securing an annular closure element having a laterally extending skirt to a container wall adjacent an opening therein, which comprises, inserting the portion of the container wall adjacent said opening between welding electrodes, mounting an annular portion of the stock of said wall around the opening therein in position with respect to a fixed axis by introducing a locating member through said opening and moving the annular portion of said stock down over said locating member to engage the periphery of said opening and said annular portion against an annular support, mounting the annular closure element with respect to said fixed axis by disposing the same over said extending locating member, seating the laterally extending skirt of the closure member on the free face of the annular portion of said stock and in overlapping relation with respect to said annular portion, applying pressure to said skirt and stock through a restricted annular zone of less width than their zone of engagement and passing an electric current through said restricted annular zone.

4. The method of securing an annular closure element having a laterally extending skirt to a container wall and surrounding an opening therein, which comprises, introducing the portion of the container wall including said opening between welding electrodes, aligning said opening with respect to said electrodes by engaging the same over a locating member and drawing the stock down to feed said opening over said locating member and engaging the periphery of said opening and an annular portion of said stock therearound against a locating seat, introducing said annular closure member between said welding electrodes and aligning the same with the opening in said container wall by seating the closure element over the portion of said locating member extending through said container wall so that the openings in said closure member and container wall are in exact alignment and the skirt of said closure member overlies the annular supported portion of said container wall around said opening, pressing said skirt and annular portion together by applying pressure through a restricted annular portion of the annular zone common to each and passing an electric current through said restricted annular portion.

5. In a welding machine, opposed annular electrode members, means for mounting said electrode members for movement toward and away from each other, yieldable means for resisting said movement in one direction, said members having work engaging faces restricted in area and means on one of said faces to receive and locate both of the annular work pieces to be welded together in exact relation, so that on drawing together of said electrodes, the face on said other electrode will engage one of said work pieces and press both of the same against the face on said one electrode.

6. In a welding machine, opposed annular electrode members, means for mounting said electrode members for relative to and fro movement, said members having work engaging faces restricted in area and means on one of said faces to receive and locate both of the annular work pieces to be welded together in exact relation, so that on the drawing together of said electrodes, the face on said other electrode will engage one of said work pieces and press both of the same between itself and the face on said one electrode.

7. In a welding machine, opposed annular electrode members, means for mounting said electrode members for relative to and fro movement, means on the face of one of said members to receive and locate in exact welding relation annular portions of the work pieces to be secured together by welding, and a restricted annular face on the other electrode member, so that, as said electrodes come together, said restricted annular face will engage one of said work pieces and will press both of said members together and against the face on said one electrode by pressure restricted in area and application.

8. In a welding machine, means for supporting a container wall adjacent an opening therein, means for restraining said wall against lateral movement on said support, means extending from said restraining means for guiding a closure element into annular engaged relation with said container wall about said opening, and annular means restricted in width to less than the width of the zone of engagement between said container wall and closure element for applying pressure to the same to force them tightly together and for passing an electric current through the same for welding them together.

9. In a welding machine, opposed annular electrode members, means for mounting said electrode members for sliding movement along a common axis, yieldable means for resisting movement of said members in one direction, said members having work engaging faces restricted in area and means on one of said faces to receive and locate both of the annular work pieces to be welded together in exact relation, so that on drawing together of said electrodes, the face on said other electrode will engage one of said work pieces and press both of the same against the face on said one electrode.

10. In a welding machine, opposed annular electrode members, means for mounting said electrode members for sliding movement along a common axis, yieldable means for resisting movement of said members in one direction, said members having work engaging faces restricted in area, one of said faces comprising a flat annular collar terminating in an upwardly extending guiding surface, said collar and surface serving to receive and accurately locate ready for welding work pieces having circular openings therein, so that on drawing together of said electrodes, the face on said other electrode will engage one of said work pieces and press both of the same against the face on said one electrode.

11. In a welding machine, opposed annular electrode members mounted for slidable movement on a common axis toward and away from each other, yieldable means for resisting movement of said electrodes in one direction, the forward end of one of said electrodes being formed with a horizontally extending collar therearound, the inner end of said collar terminating in an upwardly extending guiding surface, said collar being adapted to receive the portion of an apertured member surrounding the aperture therein and said guiding surface being adapted to guide a flanged bushing member into position to be secured to said apertured member, said other electrode having an annular leading face of restricted area for engaging an annular portion of said bushing flange whereby the members may be welded together throughout a restricted zone common to them.

12. In a welding machine for welding a bushing member having a flanged end to an apertured sheet metal wall with said flanged end secured around said aperture, opposed annular electrodes, means for mounting said electrodes for sliding movement along a common axis, one of said electrodes having its working face formed to receive said wall and said bushing member and locate the same in exact welding relation, and the other of said electrodes being formed to provide a reduced annular nose to overlie part of said bushing member and engage the flanged portion thereof in a direction to insure said exact welding relation during the welding operation.

FLECK WILLIAM SAMPLE.